US012712762B2

(12) United States Patent
Prodoehl et al.

(10) Patent No.: US 12,712,762 B2
(45) Date of Patent: Aug. 18, 2026

(54) DATA SHARING AMONG MOBILE DEVICES

(71) Applicant: Connectify, Inc., Philadelphia, PA (US)

(72) Inventors: Brian Prodoehl, Plymouth Meeting, PA (US); Kevin Cunningham, Swarthmore, PA (US); Alexander Gizis, Philadelphia, PA (US); Brian Lutz, Philadelphia, PA (US)

(73) Assignee: Connectify, Inc., Philadelphia, PA (US)

( * ) Notice: Subject to any disclaimer, the term of this patent is extended or adjusted under 35 U.S.C. 154(b) by 335 days.

(21) Appl. No.: 18/213,824

(22) Filed: Jun. 24, 2023

(65) Prior Publication Data

US 2023/0421409 A1 Dec. 28, 2023

Related U.S. Application Data

(60) Provisional application No. 63/355,215, filed on Jun. 24, 2022.

(51) Int. Cl.
*H04L 12/46* (2006.01)
*H04W 76/10* (2018.01)

(52) U.S. Cl.
CPC ......... *H04L 12/4641* (2013.01); *H04W 76/10* (2018.02)

(58) Field of Classification Search
CPC .......................... H04L 12/4641; H04W 76/10
USPC ......................................................... 370/392
See application file for complete search history.

(56) References Cited

U.S. PATENT DOCUMENTS 9,801,201 B1 * 10/2017 De Nagy Koves Hrabar ............. H04W 40/04
11,582,195 B1 * 2/2023 Karppanen ......... H04L 63/0457
2017/0171156 A1 * 6/2017 Schultz ............... H04L 63/0414
2017/0251515 A1 * 8/2017 Altman ................. H04W 76/25
2018/0041613 A1 * 2/2018 Lapidous ................ H04L 25/14
2022/0124071 A1 * 4/2022 Wright ................ H04L 63/0272
2022/0417841 A1 * 12/2022 Chak ................... H04L 12/4641
2023/0012793 A1 * 1/2023 Chak ..................... G06F 3/0481

* cited by examiner

*Primary Examiner* — Christopher B Robinson
*Assistant Examiner* — Chong G Kim
(74) *Attorney, Agent, or Firm* — Kamran Emdadi

(57) ABSTRACT

One example may include transmitting a request from a first device to a second device to retrieve data from a remote server, and the first device and the second device are operating on a common network, responsive to receiving the request, transmitting a connection request, via the second device, to a virtual private network (VPN) server over a connection between the second device and the VPN server, receiving from the VPN server, via the second device, a portion of the data retrieved from the remote server over the connection between the second device and the VPN server, and transmitting, via the second device, the portion of the data over the common network to the first device, and wherein the first device combines the portion of the data with another portion of the data received from the VPN server.

20 Claims, 12 Drawing Sheets

300

MOBILE DEVICE 312

ADDITIONAL MOBILE DEVICE(S) 314

DATA NETWORK 316

VPN SERVER 318

SESSION REQUEST 320

REQUEST FOR DATA ON BEHALF OF ADDITIONAL MOBILE DEVICE(S) 322

RECEIVING A PORTION OF THE DATA TO BE USED BY ADDITIONAL MOBILE DEVICE(S) 324

ESTABLISH SESSION 326

MONITORING DATA USE AND DATA DEGRADATION OF ALL MOBILE DEVICES 328

INSTRUCT MOBILE DEVICE ON SUPPORTING MOBILE DEVICES 332

600

700

RESPONSIVE TO RECEIVING THE REQUEST, TRANSMITTING A CONNECTION REQUEST, VIA THE SECOND DEVICE, TO A VIRTUAL PRIVATE NETWORK (VPN) SERVER OVER A CONNECTION BETWEEN THE SECOND DEVICE AND THE VPN SERVER
714

RECEIVING FROM THE VPN SERVER, VIA THE SECOND DEVICE, A PORTION OF THE DATA RETRIEVED FROM THE REMOTE SERVER OVER THE CONNECTION BETWEEN THE SECOND DEVICE AND THE VPN SERVER
716

TRANSMITTING, VIA THE SECOND DEVICE, THE PORTION OF THE DATA OVER THE COMMON NETWORK TO THE FIRST DEVICE, AND THE FIRST DEVICE COMBINES THE PORTION OF THE DATA WITH ANOTHER PORTION OF THE DATA RECEIVED FROM THE VPN SERVER
718

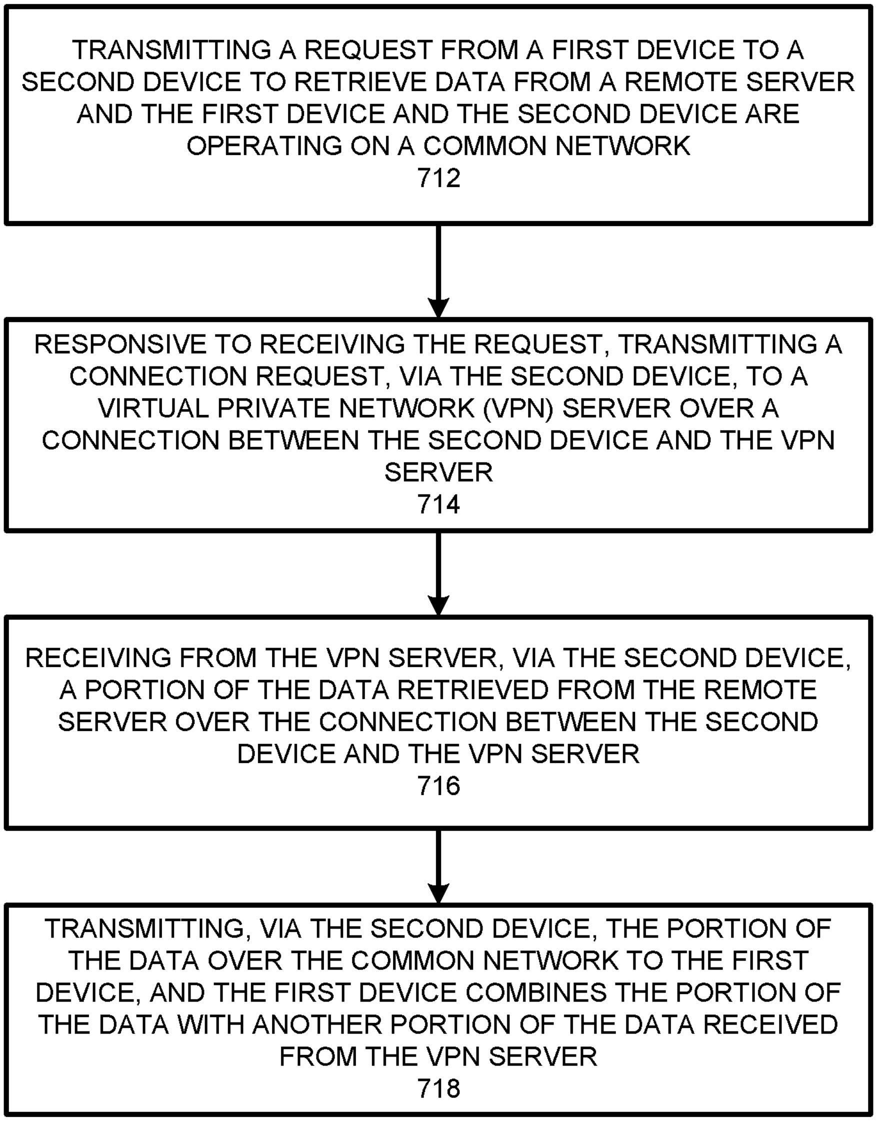

DATA SHARING AMONG MOBILE DEVICES

BACKGROUND

Data access is limited to the networks providing the data, such as a cellular data connection and/or a Wi-Fi data connection. As mobile devices or other types of computing devices move away from locations where data access is more prevalent, the options for efficient, reliable and/or high-speed data access may begin to diminish. In a remote communication environment, devices may have fewer data access options. Cellular tends to offer the most reliable data access at a reasonable range of distance away from a cellular access point. As devices congregate in a particular area and are limited to fewer network access options, the borrowing or sharing of data access to the Internet from one device to the next device may be optimal to increase data rates and to limit data degradation.

SUMMARY

One example embodiment may provide a method that includes one or more of receiving, via a mobile device, a connection request message to establish a communication session with another mobile device, forwarding, via the mobile device, a request to a virtual private network (VPN) server to receive data on behalf of the another mobile device, receiving, via the mobile device, a portion of data used by an application of the another mobile device, and creating a channel between the mobile device and the another mobile device to forward the received the portion of data to the another mobile device.

Another example embodiment may include a method that includes transmitting a request from a first device to a second device to retrieve data from a remote server, the first device and the second device are operating on a common network, responsive to receiving the request, transmitting a connection request, via the second device, to a virtual private network (VPN) server over a connection between the second device and the VPN server, receiving from the VPN server, via the second device, a portion of the data retrieved from the remote server over the connection between the second device and the VPN server, and transmitting, via the second device, the portion of the data over the common network to the first device, and the first device combines the portion of the data with another portion of the data received from the VPN server.

Another example embodiment may include a device that includes a receiver configured to receive a request from another device to retrieve data from a remote server, and the another device and the device are operating on a common network, responsive to receiving the request, a transmitter is configured to transmit a connection request to a virtual private network (VPN) server over a connection between the second device and the VPN server, and the receiver is configured to receive from the VPN server a portion of the data retrieved from the remote server over the connection between the device and the VPN server, and the transmitter is configured to transmit the portion of the data over the common network to the another device, and wherein the another device combines the portion of the data with another portion of the data received from the VPN server.

Another example embodiment may include a non-transitory computer readable storage medium configured to store instructions that when executed causes a process to perform transmitting a request from a first device to a second device to retrieve data from a remote server, and the first device and the second device are operating on a common network, responsive to receiving the request, transmitting a connection request, via the second device, to a virtual private network (VPN) server over a connection between the second device and the VPN server, receiving from the VPN server, via the second device, a portion of the data retrieved from the remote server over the connection between the second device and the VPN server, and transmitting, via the second device, the portion of the data over the common network to the first device, and the first device combines the portion of the data with another portion of the data received from the VPN server.

BRIEF DESCRIPTION OF THE DRAWINGS

FIG. 7 illustrates an example process of sharing data connections over a network according to example embodiments.

DETAILED DESCRIPTION

Figure 1:
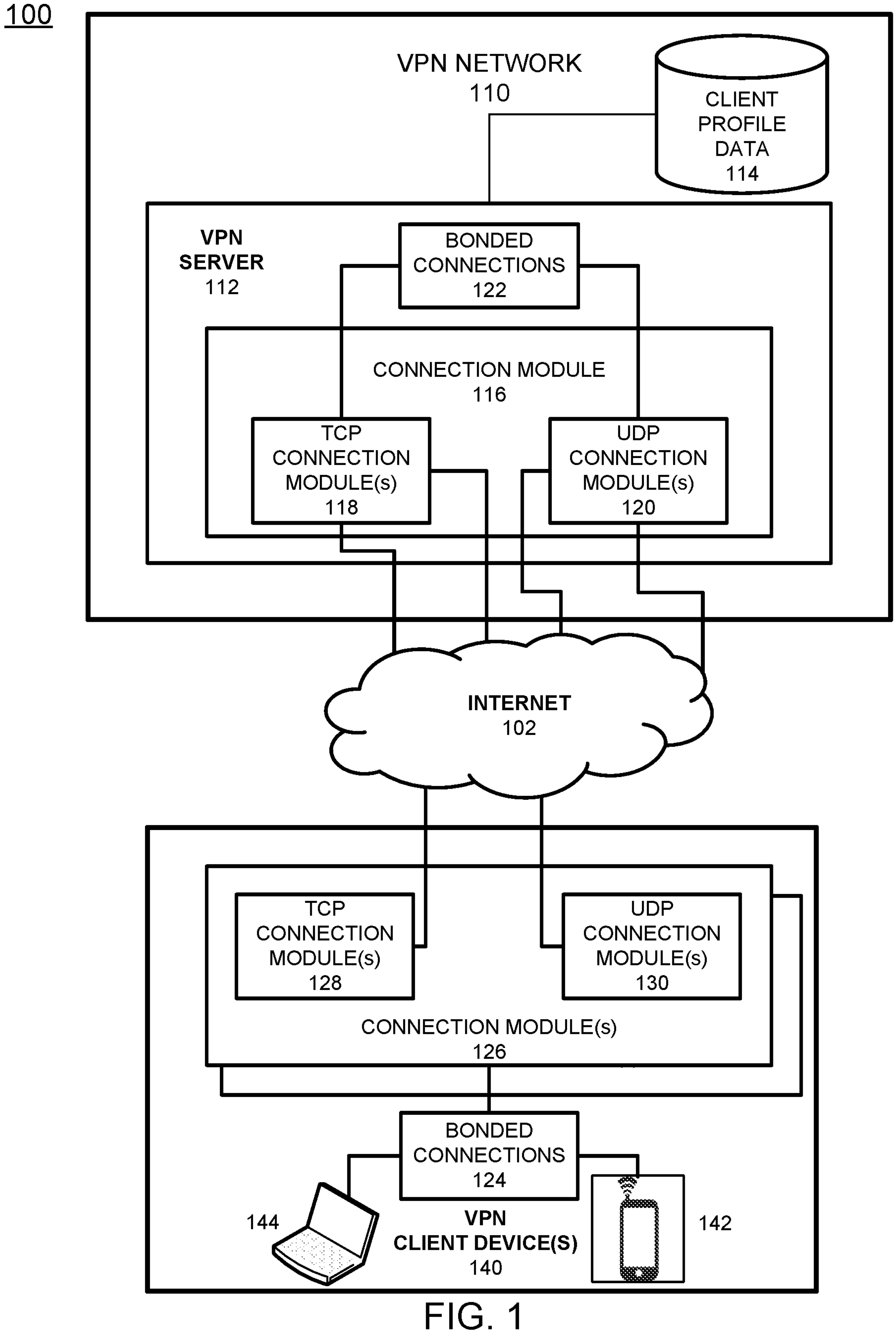
FIG. 1 illustrates a communication network used to support certain example embodiments.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments provide data management services for client devices participating in a shared data network configuration. Data may be sent and received to and from a remote network and shared between the devices to provide a larger data rate and an optimized data connection.

Example embodiments may be referred to with reference to a communication 'session'. The term 'session' may be a communication data link between a 'client' (computing device, smartphone, computer, etc.) and 'server' (content server, virtual private network server, destination server, etc.) or any two or more network-based entities in communication across a data communication network. A session may be based on a single communication link or channel or multiple links or channels. Examples of multiple channels being used in a session may be based on multiple network interface devices (i.e., network interface cards (NICs)) being used in a single session, multiple TCP/UDP sockets being created in a single session among other device resources. Multiple transport connections which are established via TCP and/or UDP may also be considered a session. Additionally, encryption that is used for the session may be independently established to include a unique key for each transport connection and/or channel established for the session. The session encryption may instead be a single key encryption used to encrypt all the communication exchanges during the session. In general, most transport connections are encrypted independently. All of the described examples of a session may be adapted to include one or more alternatives or combinations thereof. Each session may be subjected to multiple different communication mediums providing a variety of one or more channels, transports, radio links, physical links, network interface cards and wireless and/or wired connections.

Network connection optimization for an application server provides data network access through communication channels to one or more client devices. Data communication protocols may include one or more of a transmission control protocol (TCP) and/or a user datagram protocol (UDP). Also, the TCP/IP protocol suite enables the determination of how a specific device should be connected to the Internet and how data can be exchanged by enabling a virtual network when multiple network devices are connected. TCP/IP stands for transmission control protocol/Internet protocol and it is specifically designed as a model to offer reliable data byte streams over various interconnected data networks.

UDP is a datagram/packet oriented protocol used for broadcast and multicast types of network transmissions. The UDP protocol may work similar to TCP, but with some of the error-checking criteria removed which reduces the amount of back-and-forth communication and deliverability requirements.

TCP is a connection-oriented protocol and UDP is a connectionless protocol. The speeds associated with TCP are generally slower than UDP, while the speed of UDP is generally faster within the network with regard to sending data across a network. TCP uses a 'handshake' protocol such as 'SYN', 'SYN-ACK', 'ACK', etc., while UDP uses no handshake protocols. TCP performs error checking and error recovery, and UDP performs error checking, but discards erroneous packets. TCP employs acknowledgment segments, but UDP does not have any acknowledgment segment.

A TCP connection is established with a three-way handshake, which is a process of initiating and acknowledging a connection. Once the connection is established, data transfer begins and when the transmission process is finished the connection is terminated by the closing of an established virtual circuit. UDP uses a simple transmission approach without implied hand-shaking requirements for ordering, reliability, or data integrity. UDP also disregards error checking and correction efforts to avoid the overhead of such processing efforts at the network interface level, and is also compatible with packet broadcasts and multicasting.

TCP reads data as streams of bytes, and the message is transmitted to segment boundaries. UDP messages contain packets that were sent one by one. It also checks for integrity at the arrival time. TCP messages move across the Internet from one computer to another. It is not connection-based, so one program can send lots of packets to another. TCP rearranges data packets in a specific order. UDP protocol has no fixed order because all the packets are independent of each other. The speed for TCP is slower and UDP is faster since error recovery is omitted from UDP. The header sizes are 20 bytes and 8 bytes for TCP and UDP, respectively.

In general, TCP requires three packets to set up a socket connection before any user data can be sent. UDP does not require three packets for socket setup. TCP performs error checking and also error recovery and UDP performs error checking, but discards erroneous packets. TCP is reliable as it guarantees delivery of data to the destination router. The delivery of data to the destination is not guaranteed by UDP. UDP is ideal to use with multimedia like voice over IP (VoIP) since minimizing delays is critical. TCP sockets should be used when both the client and the server independently send packets and an occasional delay is acceptable. UDP should be used if both the client and the server separately send packets, and an occasional delay is not acceptable.

FIG. 1 illustrates an example data session network configuration according to example embodiments. Referring to FIG. 1, the configuration 100 may include a virtual private network (VPN) 110 which includes one or more VPN servers 112 and data storage, which in this case is used for storing client profile data 114 associated with one or more new or old client communication sessions. The term 'VPN' may represent one or more servers designated to perform the VPN functionality. The communication sessions may include multiple network channels, generally, UDP and TCP are used for such sessions, however, other protocols used across the Internet 102 may also be used, such as HTTPS. The channels may be bonded together to create a single virtual channel for communication as shown from the bonded connections module 122 for the VPN server 112 and the bonded connections module 124 of the client device 140. In general, the VPN 112 may include UDP module(s) 120 and a TCP module(s) 118 as part of a connection module 116 to manage the connection process and a bonded connections module 122 to manage the various channels and the bonding of information among the channels.

The client side may include one or more client devices 140 such as a smartphone 142, cell phone, tablet, laptop 144, etc. Any one of those individual devices may be the 'client device' 140 at any particular time for a particular session. The client side may have an installed agent software application that communicates with the cloud servers of the VPN network 110. The communications are established and maintained across the Internet 102. The client side may also have its own bonded connections module 124 which manages one or more TCP/UDP connections associated with TCP/UDP connection modules 128/130, each of which may have multiple modules to accommodate multiple session, as part of the connection module(s) 126 of the client side. The module 126 may be multiple modules which are used for multiple respective sessions with various end user devices 140.

In general, a transport connection is a connection between the VPN client and the VPN server over a particular network and/or Internet connection using a particular protocol, such as TCP, UDP, HTTPS, or another protocol. The established connection is used to send encapsulated and/or encrypted application packets between the client and the server. In one example embodiment, multiple transports connections are created for each session over the available networks and protocols. Conventionally, a VPN will create one transport connection over one network with one protocol per session. For example, given two networks to utilize, the data connection optimization application may create three transport connections (e.g., TCP, UDP, and HTTPS) over each network, for a total of six transport connections. Other combinations of connection types, numbers of connections, etc., may also be utilized.

A VPN may be used by any client device participating in a collaboration session (i.e., conference) with other client devices. One device among a plurality of devices may be using a VPN while others are not using any VPN. All of the devices may send data and receive data to and from an application server in a cloud network, however, one or more client devices may use a VPN server as an intermediate/third party device to assist with the data management of that particular client device. One strategy employed by a VPN may include channel management over a single session. For example, multiple channels may exist for a single client device and can be combined into a bonded channel (unique data is sent on more than one channel), a mirrored channel (the same data is sent on more than one channel) or a combination of both. The channel management activities may permit packets to be sent and received faster and/or with fewer errors depending on the strategy employed by the VPN server. The VPN server(s) may have an optimal Internet connection to the application servers in the cloud network, and may use certain fundamental routing strategies to optimize data traffic quality, the VPN could send video data first from certain client devices to the cloud servers as opposed to browser request data, e-mail data, and other types of Internet data. All of these data management strategies and others can be managed by a VPN specific application that is operating on the client devices while the conference or other collaboration application is being utilized. The VPN application may be a background type of application that is not detectable by the user or other applications using Internet data services. The VPN server may also attempt to host its own conference assuming the VPN server offers an application that is managed locally by the VPN server so the client devices which are part of that VPN network can have the VPN server perform additional conference application functions.

Figure 2A:
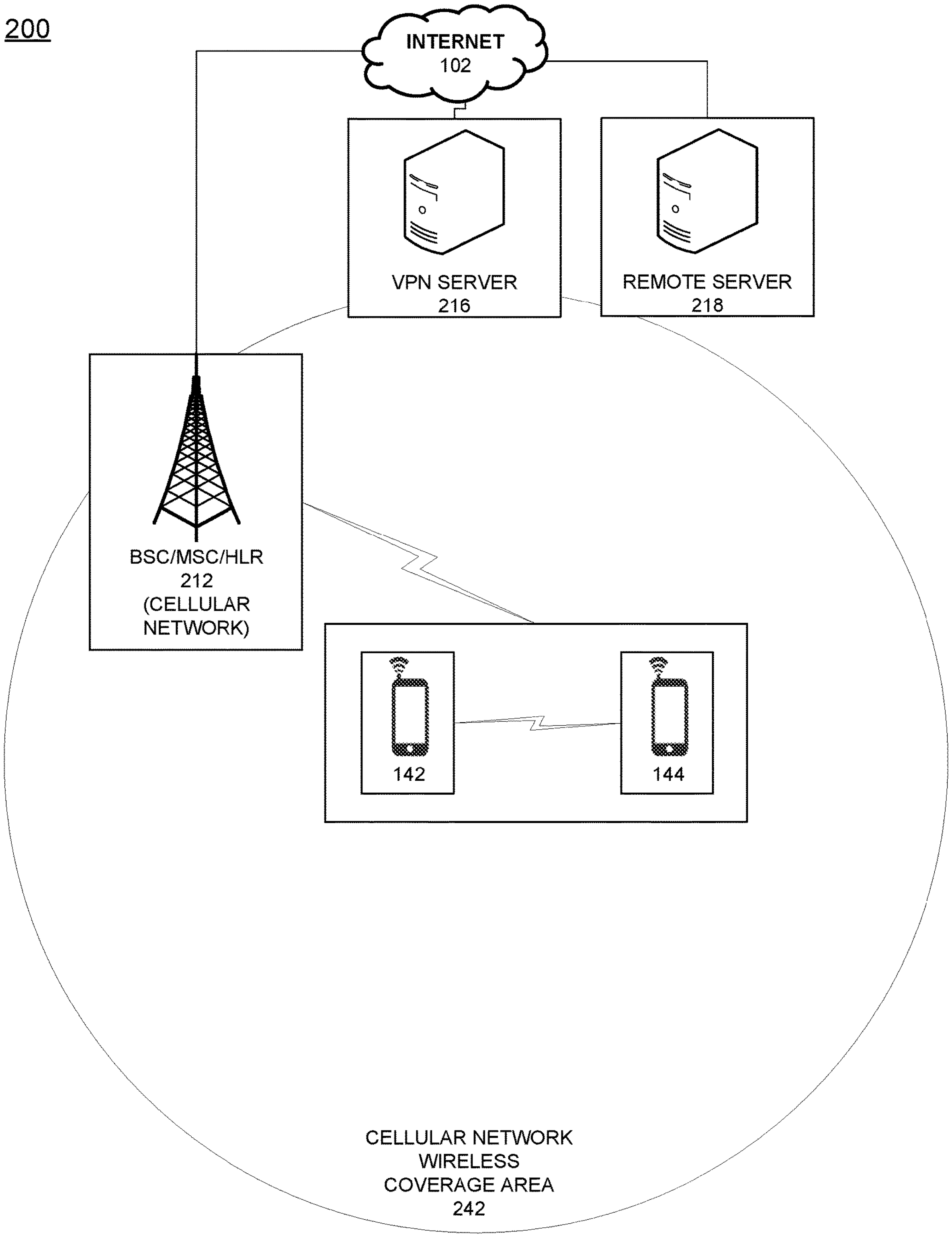
FIG. 2A illustrates a network example of two mobile devices providing data support in a remote communication environment according to example embodiments.

FIG. 2A illustrates a network example of two mobile devices providing data support in a remote communication environment according to example embodiments. Referring to FIG. 2A, the network 200 includes a cellular access point 212, such as a base station with related components, including but not limited to a (3G, 4G, 5G, 6G, etc.) 'X'G data service, a home location register (HLR), and other cellular network service providing entities which provide coverage within a particular area 242. Other networks, such as a wireless local area network (WLAN) communication network, a Wi-Fi network, a satellite network, etc., may also be used to provide data service to the client devices (i.e., mobile) devices 142 and 144. Internet data may be accessible via the Internet which is linked to the mobile network 212 and to a remote server 218 where the mobile devices 142/144 may be seeking access in order to download data, such as streaming content. In this example and in other examples, a VPN server 216 may be used to manage the data access as an intermediary that receives the data on behalf of the client devices 142 and 144 which in this case are both subscribed to the VPN service. One or more devices may be a subscriber to the VPN service managed by the VPN server 216. Some devices may not be subscribed to the VPN server 216 but may still be able to assist with data management by offering bandwidth and downloading data on behalf of other client devices.

Figure 2B:
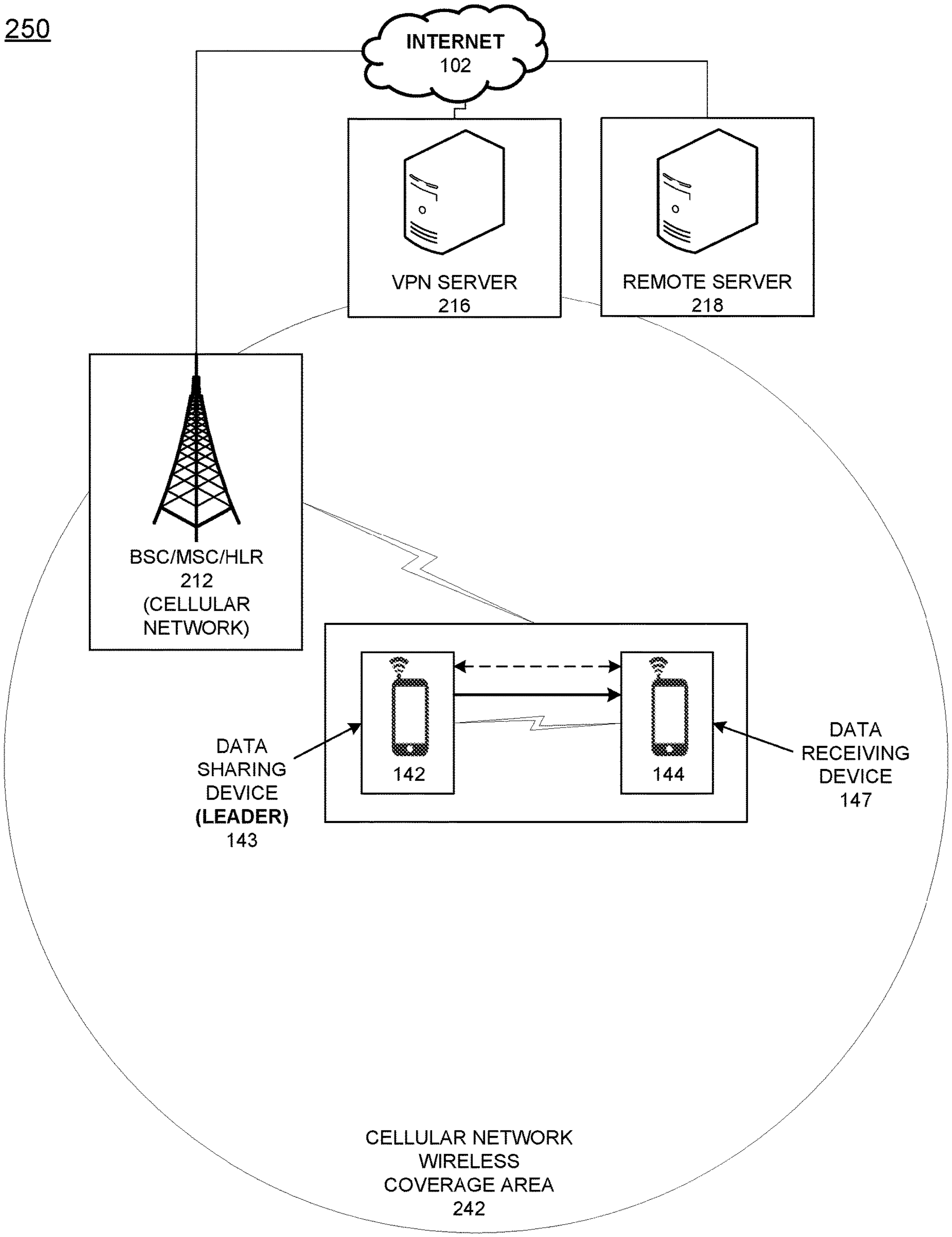
FIG. 2B illustrates a network example of two mobile devices where one is providing data support to the other in a remote communication environment according to example embodiments.

FIG. 2B illustrates a network example of two mobile devices where one is providing data support to the other in a remote communication environment according to example embodiments. Referring to FIG. 2B, the network example 250 demonstrates how the two mobile devices may initiate a data sharing operation which may include creating a session directly between the devices 142 and 144 for communication through the cellular network 212 and the VPN server 216, which may be monitoring the devices 142/144, and/or communicating directly between the devices by a wireless communication signal (e.g., NFC, Bluetooth, WLAN, 802.11xx, etc.). In operation, the devices may be in a remote location, such as an outdoor park or an industrial work zone and may still be able to communicate with a cellular network 212. The devices may forward a communication via the cellular/VPN server 216 to one another or may communicate directly. The communication may attempt to establish a communication channel or session that uses a communication protocol that is recognized by both devices. A determination may be made that one device 144 is attempting to stream data, for example, such as a video with a large amount of data. Device 142 may be acting as a host or leader 143 and may monitor the data activities of device 144. A monitoring action may also be performed by VPN server 216. Once the determination is made that the device 144 will need more data to maintain a data downloading integrity level, which may be measured based on one or more thresholds of jitter, latency, packet loss, data rate, etc., the host device 143 may share data with data receiving device 147.

Figure 2C:
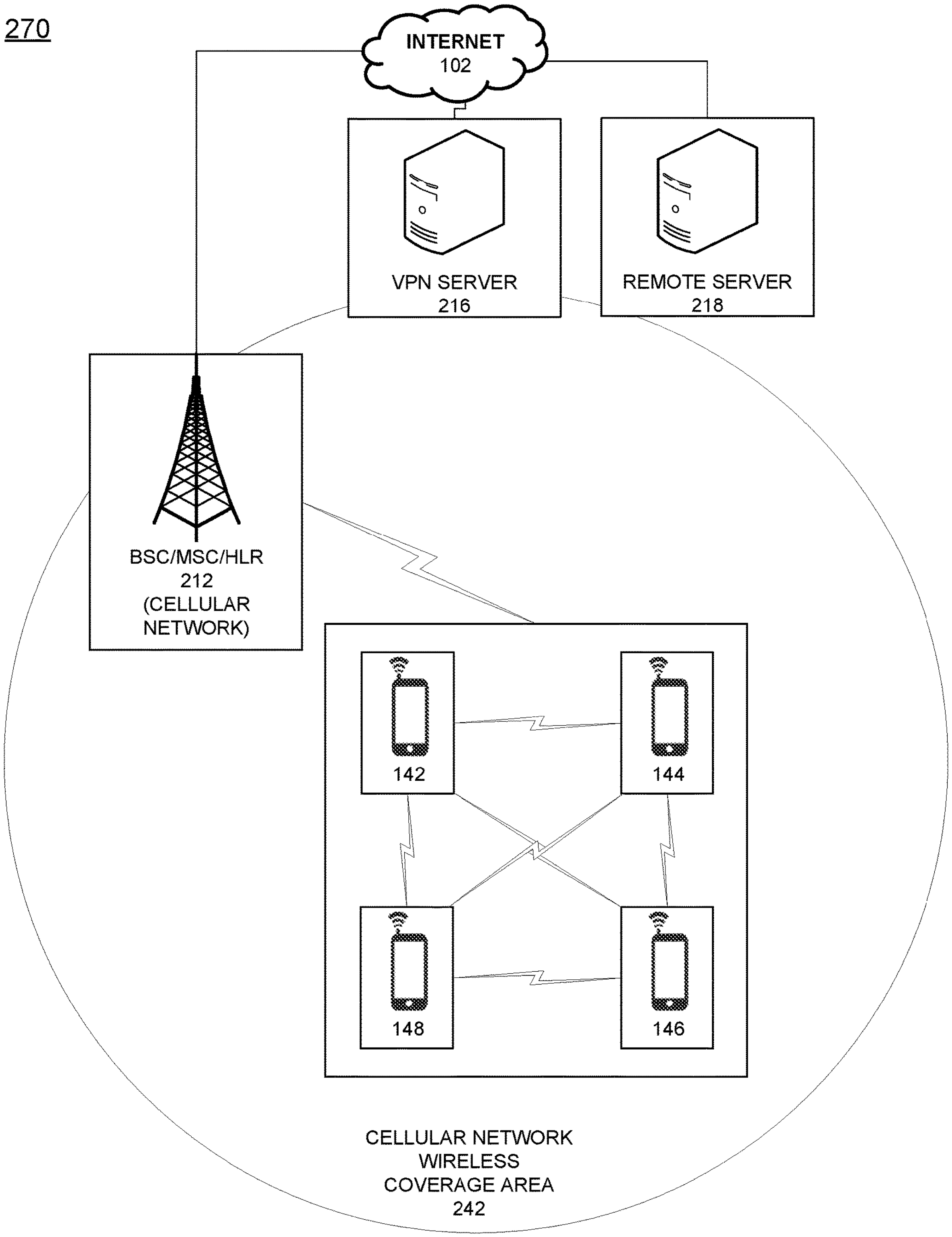
FIG. 2C illustrates a network example of multiple mobile devices providing data support to one another in a remote communication environment according to example embodiments.

FIG. 2C illustrates a network example of multiple mobile devices providing data support to one another in a remote communication environment according to example embodiments. Referring to FIG. 2C, in this example 270 there are four mobile devices in a similar environment. The four devices 142-148 may form a communication network similar to the example in FIGS. 2A and 2B. In this example, the devices may include the host or leader 143 which is the device which mediates and controls the data sharing and support operations of all devices. Specifically, the data receiving device 147 may be receiving streaming data and may require assistance with maintaining a particular data rate.

Figure 2D:
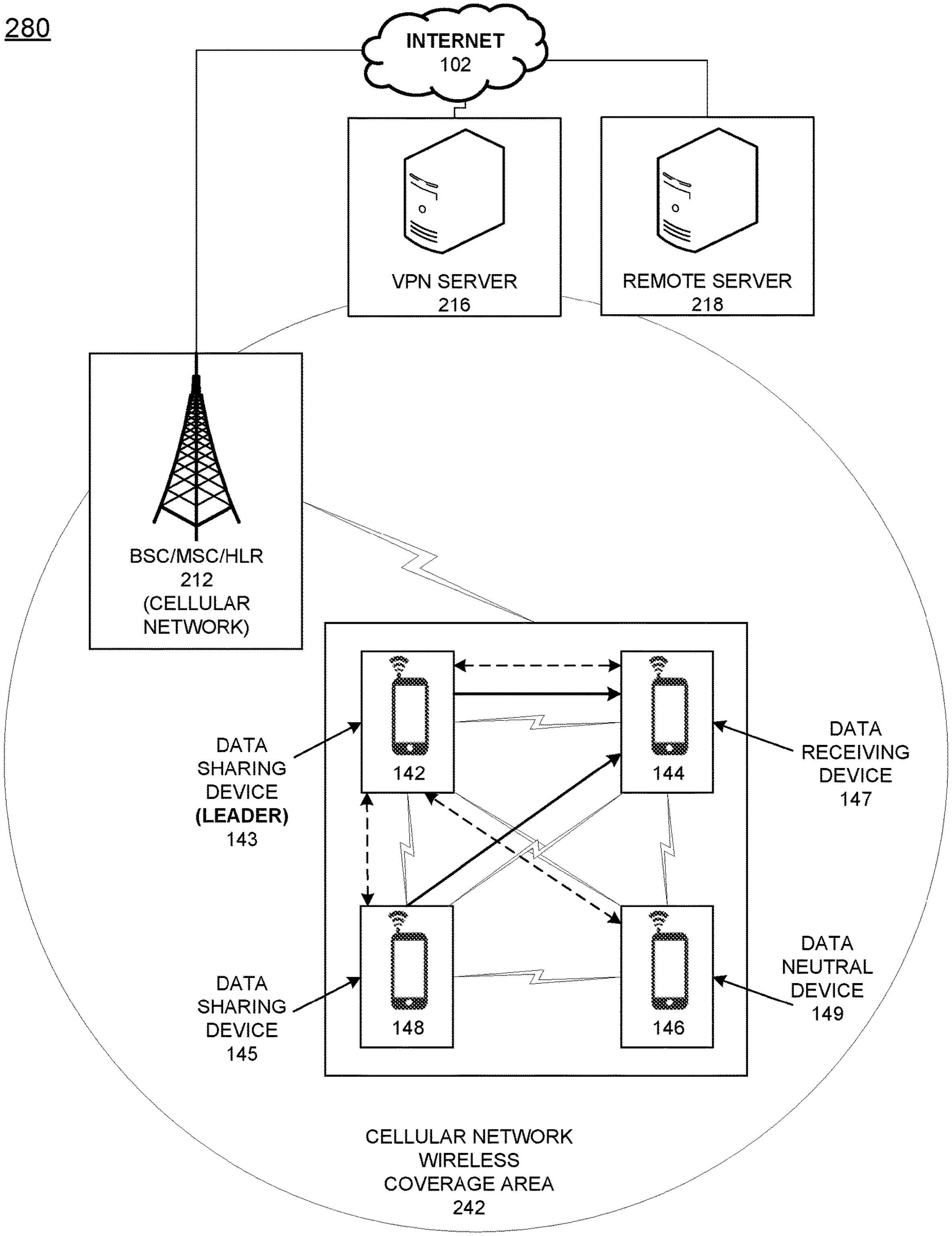
FIG. 2D illustrates a network example of multiple mobile devices where two devices are providing data support to another device in a remote communication environment according to example embodiments.

FIG. 2D illustrates a network example of multiple mobile devices such that two devices are providing data support to another device in a remote communication environment according to example embodiments. Referring to FIG. 2D, the example 280 may include the host or leader device 143 offering data by its own cellular connection along with data sharing device 145. The last device 146 may maintain a neutral device position 149 by not sharing data with others. As the VPN server 216 is notified by the host device 143 about the three device statuses (143, 145 and 147) all attempting to download data from remote server 218 on behalf of the data receiving device 147, the VPN server 216 may dictate which device(s) downloads which portions of the data. For example, a portion of the data may be downloaded by 143, another portion by 145 and the remaining portion by 147. Once each of the three devices has received the data, the device 143 as the host may forward the data directly to 147. The device 145 may forward the data directly to the data receiving device 147 or to the host 143 which will forward the data to 147. The host can act as a proxy that receives all portions of the data and forwards them to the data receiving device 147 needing data assistance. In another example, the data streams between devices may be direct by short range wireless communication protocols. The VPN server 216 may determine which portions the devices will download and how they will forward the data to the intended destination device. The data sharing device 148 may also forward its received data to the data receiving device 147.

Figure 2E:
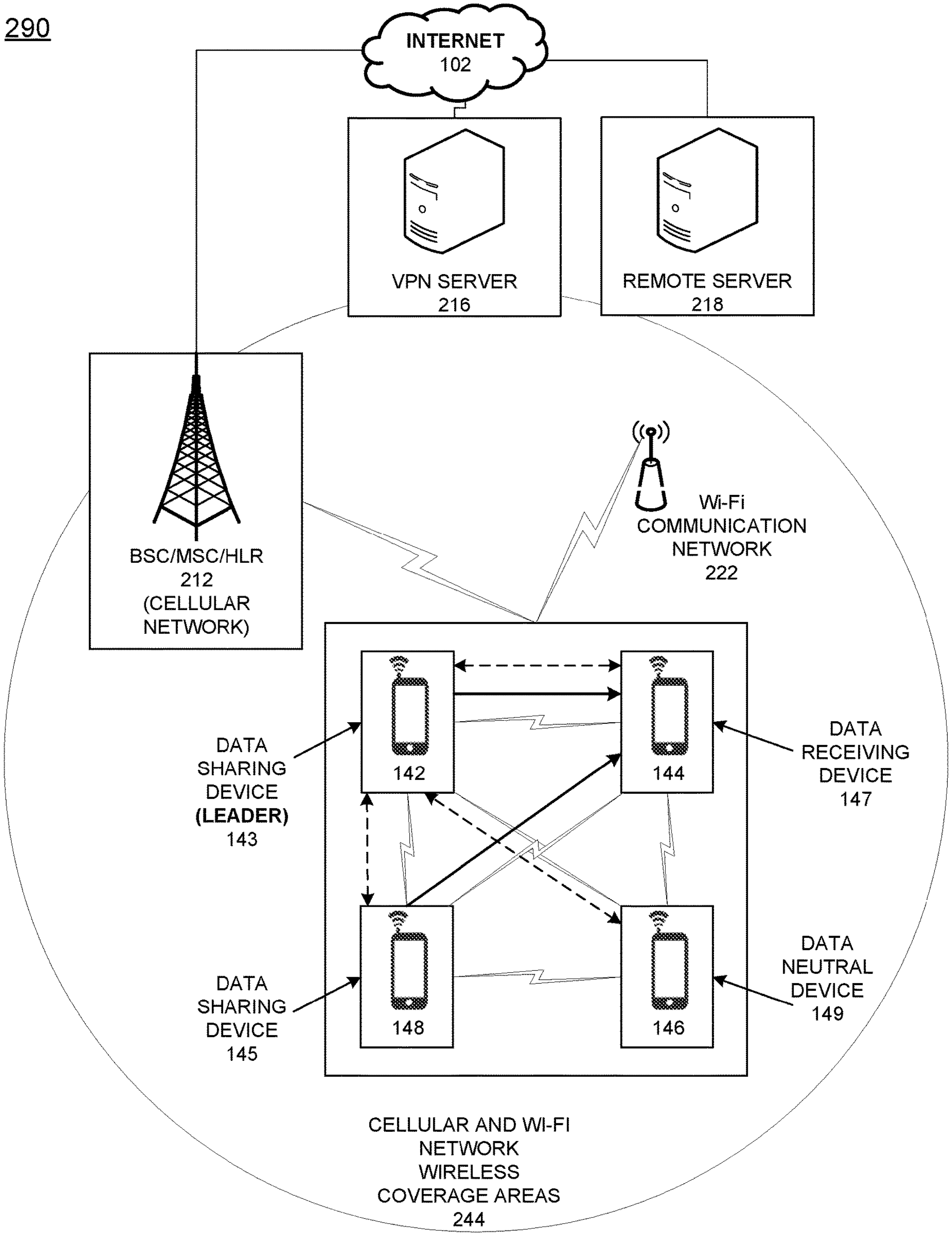
FIG. 2E illustrates a network configuration example of multiple mobile devices and where two devices are providing data support to another device in a remote communication environment including cellular and Wi-Fi networks according to example embodiments.

FIG. 2E illustrates a network example of multiple mobile devices where two devices are providing data support to another device in a remote communication environment including cellular and Wi-Fi networks according to example embodiments. Referring to FIG. 2E, the network environment 290 includes the cellular network access to each of the mobile devices 142-148, however, the additional Wi-Fi network 222 provides a network that any one or more of the mobile devices may connect to and use for communication purposes. The Wi-Fi coverage area and the cellular coverage area 244 may overlap to provide network communication signals to all mobile devices within that particular area as offered by all such networks. The Wi-Fi network 222 can be used by the mobile devices to share data among one another as the Wi-Fi network may not have access to the Internet but may provide a data service for any nearby devices to communicate, such as a local router, a campus Wi-Fi communication environment, one of the mobile devices acting as a hotspot device, etc. Also, if the Wi-Fi network 222 does provide data services then that additional data may be used along with the cellular data, such as for downloading and sharing among the mobile devices on an as needed basis, and as managed by one or more of the mobile device 'hosts'.

Figure 3:
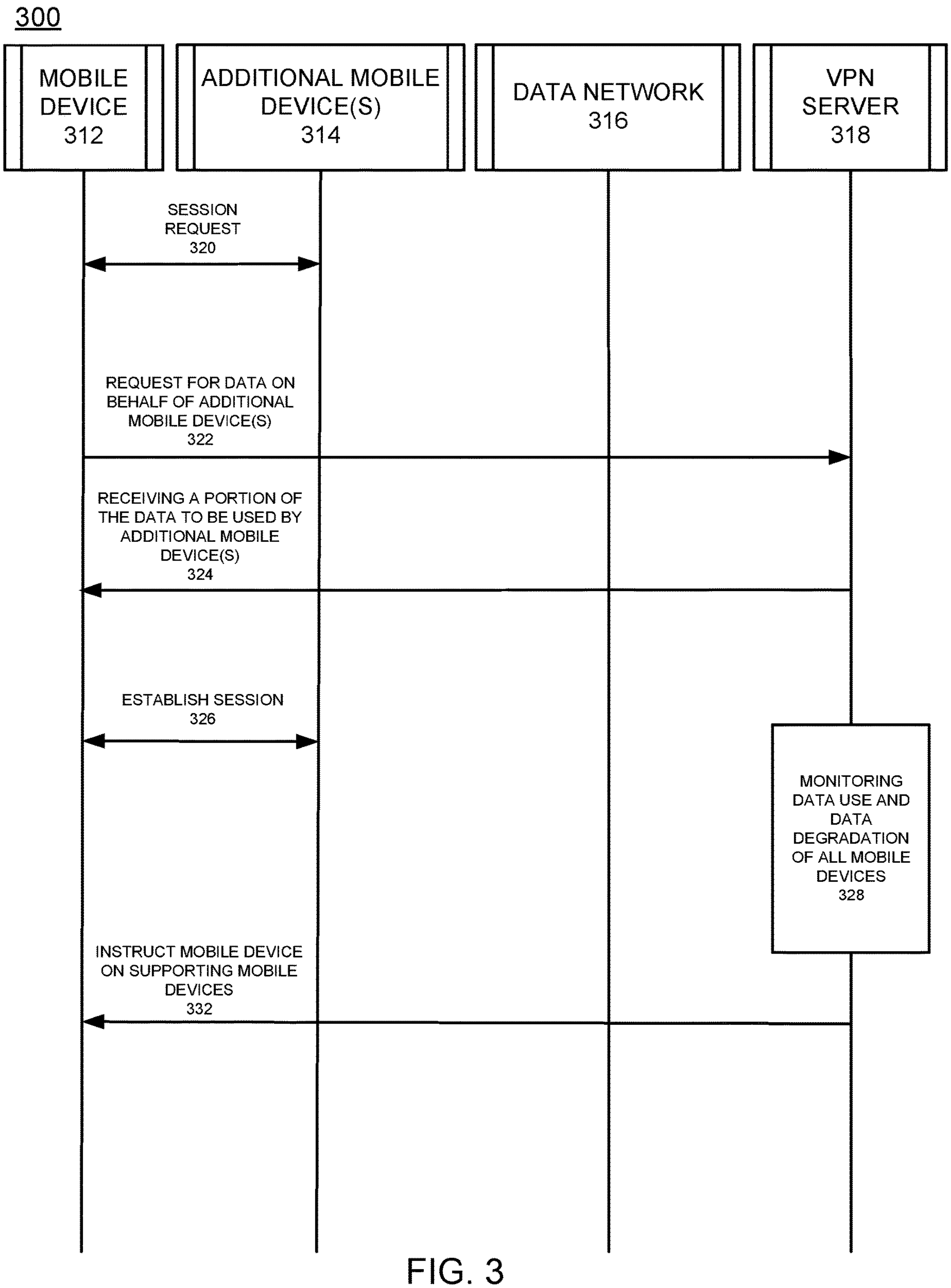
FIG. 3 illustrates a system configuration where data support is being provided to various other devices in a data network according to example embodiments.

FIG. 3 illustrates a system configuration where data support is being provided to various other devices in a data network according to example embodiments. Referring to FIG. 3, the example 300 includes one mobile device 312 and other additional mobile devices 314 which may work together to share data. A session request 320 may be sent and received by all participating devices. When the devices begin using the data network 316 (e.g., cellular), the data may be received by the VPN server 318 prior to being forwarded to the cellular network and back to the devices. When an instance arises where the additional mobile devices 314 require additional data by any other device, a request 322 can be sent by all devices which are willing to assist with data sharing. The VPN server 318 may then assist with the devices downloading data from a particular data source and sharing the data 324 among other devices. All the participating mobile devices may establish a communication session 326 between one another, which enables data sharing among the devices. The VPN server 318 can continue monitoring 328 any of the devices to identify whether any data degradation has occurred (e.g., loss, jitter, latency, bandwidth limitations) and whether a device is trying to perform a data downloading operation and should receive additional assistance. The instructions 332 from the VPN server 318 may include notifying one device to assist another device(s) since data degradation may have been detected.

Figure 4:
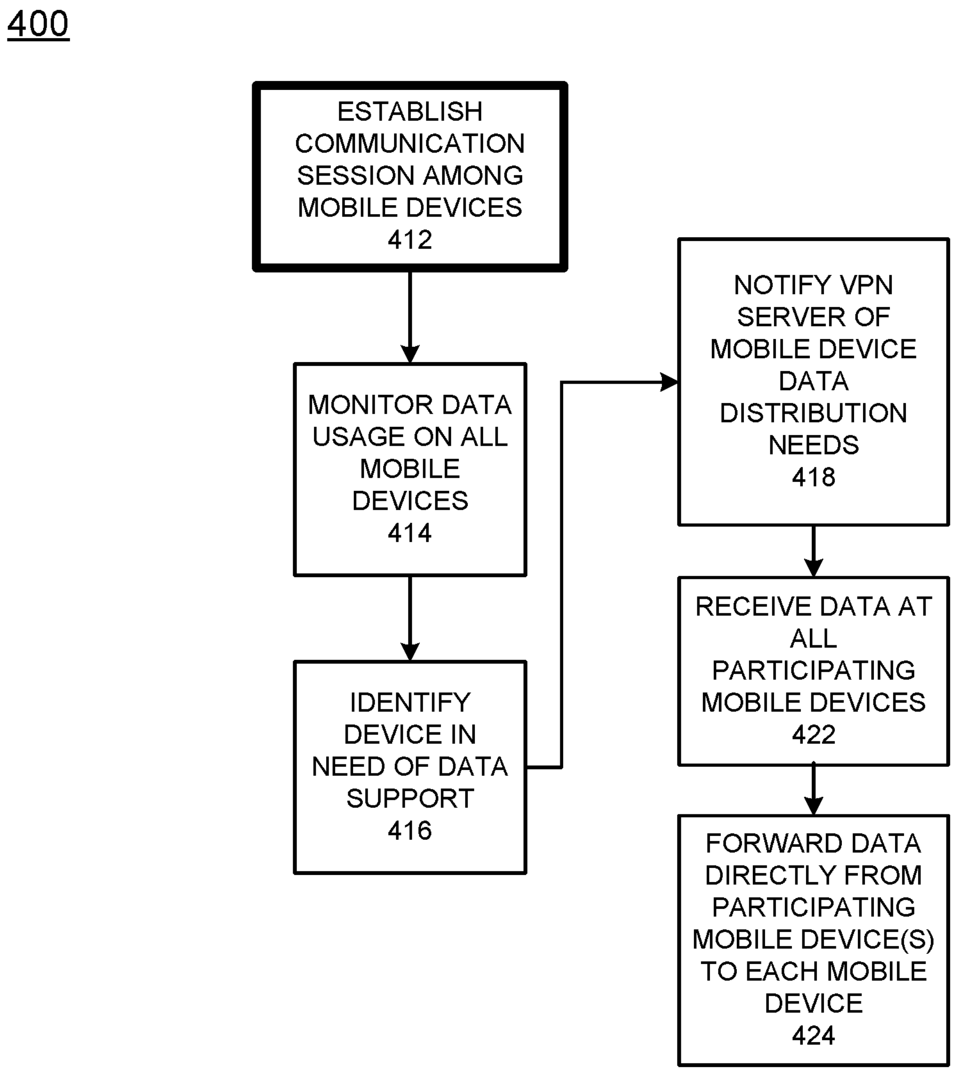
FIG. 4 illustrates a flow diagram of an example process of data support among mobile devices in a remote communication environment according to example embodiments.

FIG. 4 illustrates a flow diagram of an example process of data support among mobile devices in a remote communication environment according to example embodiments. Referring to FIG. 4, the flow diagram 400 includes operations including establishing a communication session with various mobile devices 412, monitoring data usage of the devices 414 to identify whether data should be shared by one or more devices, identifying one or more devices in need of data support 416 and notifying 418 a VPN server of the mobile device data distribution needs. The data is received 422 from a data network at all participating devices and is forwarded 424 to a host device prior to the host device forwarding the data to the device(s) in need of data support, or, the data is forwarded directly from each device to the mobile device(s) in need of data support.

One example process of operation may include receiving, via a mobile device, a connection request message to establish a communication session with another mobile device, forwarding, via the mobile device, a request to a virtual private network (VPN) server to receive data on behalf of the another mobile device, receiving, via the mobile device, a portion of data used by an application of the another mobile device, and creating a channel between the mobile device and the another mobile device to forward the received portion of data to the another mobile device. The process may also include determining, via the mobile device, the another mobile device is experiencing data degradation and based on application use by the another mobile device, and wherein the communication session is established as a wireless local area network (WLAN). The mobile device and the another mobile device communicate over the channel via a Wi-Fi communication protocol and receive data from the VPN via a cellular data network connection. The portion of the data includes a portion of streaming content packets which are combined by the another mobile device with another portion of streaming content packets received by the another mobile device from a cellular network. The process may also include monitoring, via the mobile device, data usage of the another mobile device, and determining the another mobile device requires additional data due to one or more applications operating on the another mobile device causing data degradation over a period of time. The process may also include determining the another mobile device requires additional data by a monitoring operation performed by the VPN server and receiving, via the mobile device, an instruction from the VPN server to provide data support for the another mobile device.

Figure 5:
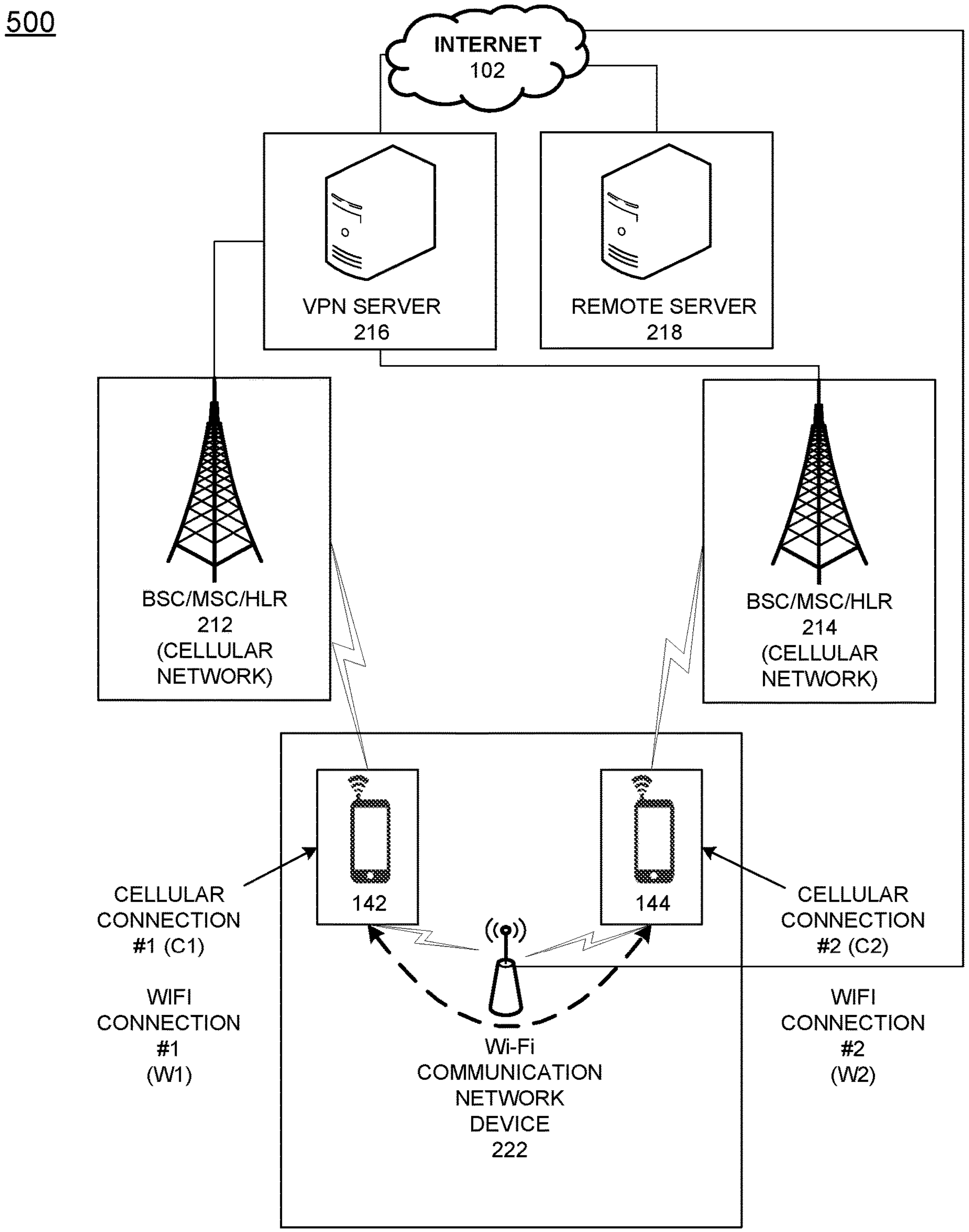
FIG. 5 illustrates a network configuration example of two devices sharing data over a Wi-Fi network according to example embodiments.

FIG. 5 illustrates a network configuration example of two devices sharing data over a Wi-Fi network according to example embodiments. Referring to FIG. 5, the network configuration 500 demonstrates an example where two client devices are communicating through a Wi-Fi network. Both the client devices may be communicating with respective cellular communication networks 212 and 214, which may be the same carrier network or different networks representing different cellular carriers. In an example configuration, the client devices 142 and 144 may be using cellular data to communicate with one or more remote servers 218. The cellular data may be provided by the cellular communication networks 212/214, however, the data may also be routed to a VPN server 216 which encrypts the data and forwards the data to its intended destination, such as remote server 218. A client VPN application operating on the client device(s) may enable the client device(s) to communicate with the VPN server 216. The operation of the VPN server 216 may enable the client devices to share cellular data among each other via a local Wi-Fi data connection enabled by a Wi-Fi router device 222.

In one example configuration, the client device 142 may receive a cellular data connection C1 and a Wi-Fi network data connection W1. In a first scenario, the cellular data C1 and Wi-Fi data W1 of device 142 are both providing access to the Internet 102 and/or to another network. Another example may include the Wi-Fi network 222 providing a communication protocol, such as 802.xx for communication among connected devices and no access to the Internet or other networks. Assuming the Wi-Fi network 222 is providing Internet access via the Wi-Fi communication device 222, then the client devices 142 and 144 may access the Internet via the Wi-Fi network. The client devices 142 and 144 may also be communicating with their respective cellular base stations 212 and 214. As one client device 142 attempts to retrieve and download data from a remote server 218, the client device 142 may desire additional data support that is available via the other client device 144.

In one example, the client device 142 may be using the Wi-Fi network, via the Wi-Fi communication device 222 (e.g., router, access point, etc.) and/or the cellular network, via base station 212 to communicate with the remote server 218 and download data in an ongoing manner, such as via streaming data, large data file(s), etc. FIG. 7 illustrates an example flow diagram of a process of sharing data over a common network. Referring to FIG. 7, the client device 142 may transmit a request to another (e.g., second, third, etc.) device 144 to retrieve data from the remote server 218, and the first device and the second device are operating on a common network (e.g., Wi-Fi network). The second device 144 may then transmit a connection request to the virtual private network (VPN) server 216 over a connection between the second device and the VPN server. The first device may then receive from the VPN server, via the second device 144, a portion of the data retrieved from the remote server 218 over the connection between the second device 144 and the VPN server 218, and the second device 144 may transmit the portion of the data over the common network to the first device 142, which combines the portion of the data with another portion of the data received from the VPN server 216. The first device 142, in this example, may have been downloading a streaming video and a portion of the video may have come from its own connection to a cellular network 212 which provides a connection to the Internet, a connection to the Wi-Fi network which provides a connection to the Internet, and/or a portion from the Wi-Fi network used as a medium to transfer data from the second device 144 to the first device 142. The second device 144 may have connected to the VPN server 216 via its own cellular connection 214 based on an instruction associated with the request received from the first device 142. In one example, the second device 144 does not have an account or any prior relationship with the VPN server 216, however, the first device 142 may be a VPN client device that is registered to communicate with the VPN server 216 by an account subscription. The first device is a VPN client and can instruct other devices to communicate with the VPN server 216 for the benefit of the first device 142, such as to have the other device(s) retrieve data on behalf of the first device 142. In this example, the second device 144 is not a registered VPN client device of VPN server, which means the second device 144 may not have an account, a profile and/or may not be a subscriber to the VPN server. In another example, the second device 144 may instead be a registered VPN client device to the same VPN server. In either case, the first device 142 being a registered VPN client entity may receive the benefit of data sharing and any non-registered entities may not receive the benefit of data sharing but may provide data sharing as instructed by the registered VPN client, in this case client device 142.

Continuing with the same example, the second device 144 may receive the portion of the data over a cellular connection associated with the second device. The request may be sent from the first device 142 to the second device 144 over a Wi-Fi connection associated with the first device and the second device both operating on the common network. The request may also be sent directly from device to device via a direct communication medium and protocol. The first device 142 may receive another portion of the data over a cellular connection associated with the first device, the another portion or other portion may be part of the same data stream, data file, etc. The VPN server 216 may perform channel bonding of the cellular connection of the first device with the connection of the second device, which is also a cellular connection that connects to the VPN server 216 to communicate with the remote server 218, and retrieve the data from the remote server 216 over the bonded connection, and the retrieved data may include the portion of the data and the another portion of the data. The bonded connection may include one particular packet of data being sent over one connection and another particular packet being sent over another connection. In this example, the packets are different from one another and may be part of the same data stream. Once the connections are bonded other channel communication procedures may be performed, such as channel mirroring which includes sending the same packets over both connections to ensure reliability. The decision to perform channel bonding, alternating data communication and/or channel mirroring may be performed by the VPN server 216 depending on a current state of the communication channels, such as latency, jitter, packet loss, etc.

In another example, the VPN server may perform channel bonding of the cellular connection of the first device 142 with the connection of the second device, which may be a Wi-Fi connection and/or a cellular connection and retrieve the data from the remote server 218 over the bonded connection, and the retrieved data may include the portion of the data and the another portion of the data. The two device example provides at least four data transferring possibilities benefitting the first device 142, the first possibility is cellular data of the first device 142, the second possibility is the Wi-Fi data of the first device 142, the third possibility is the cellular data of the second device 144 and the fourth possibility is the Wi-Fi data of the second device 144. During a sharing scenario, all the data communication paths may be used to benefit the first device 142 while the second device 144 is sharing data with the first device 142. In general, a Wi-Fi network that is shared by more than one device would not provide Internet data to two separates devices which is then shared from one device to another device unless the Wi-Fi network had bandwidth limitations on each device such that one device could share its Internet data connection on the Wi-Fi network with another device on the same Wi-Fi network. Generally, the sharing of Internet data among client device is performed based on different cellular connections and the Wi-Fi network is merely used just to provide a medium for sharing locally among client devices. However, additional data could be shared among client devices based on an Internet connection provided by the Wi-Fi network to each of the client devices.

The example may also include uploading, via the second device 144, upload data originating from the second device to the VPN server 216 while the second device receives the portion of the data destined for the first device from the VPN server. The second device 144 may continue downloading and uploading data while sharing data, as only a portion of the data stream(s) sent and received by the second device 144 may be intended for the first device 142, while other portions sent and received may be intended for the second device 144 as the data destination. This enables the second device 144 to continue data communications while providing data assistance and sharing with the first device 142. The sharing operation may have a finite time interval where the sharing is performed and upon expiration of the finite time interval, the sharing may cease. The sharing may be performed until the physical temperature of the client device exceeds a threshold, such as 'X' degrees, then the data sharing may cease. The sharing may be performed until an amount of data threshold is reached, such as '2' gigabytes of data, then the data sharing may cease. The sharing may be performed until the client device performing the data sharing has reached a low battery level, such as 'X' percent remaining, then the sharing may cease.

In this example above, the first device 142 is a VPN client, the second device 144 is willing to share its data with the first device 142 over the common network, such as the Wi-Fi network. Both devices could be using cellular, and/or data from the Wi-Fi network during the share process. The second device is communicating with the VPN server 216, however, this connection is on behalf of the first device which is a VPN client operating a VPN client software application that enables the first device to identify and communicate with the VPN server 216. This sharing application enables the first device to use the second device to communicate with the VPN server 218. As a result, the second device may not be a VPN client, however, its connection could be bonded with the connection established by the first device as a VPN client and the first device can then receive the benefit of the bonded connections of its own connection and the second device's connection. The data received at the second device is forwarded across the common network to the first device 142 which may also receive its own data from the VPN server 216, which may also arrive from the Wi-Fi network or a direct cellular connection between the first device 142 and the VPN server 216.

Figure 6:
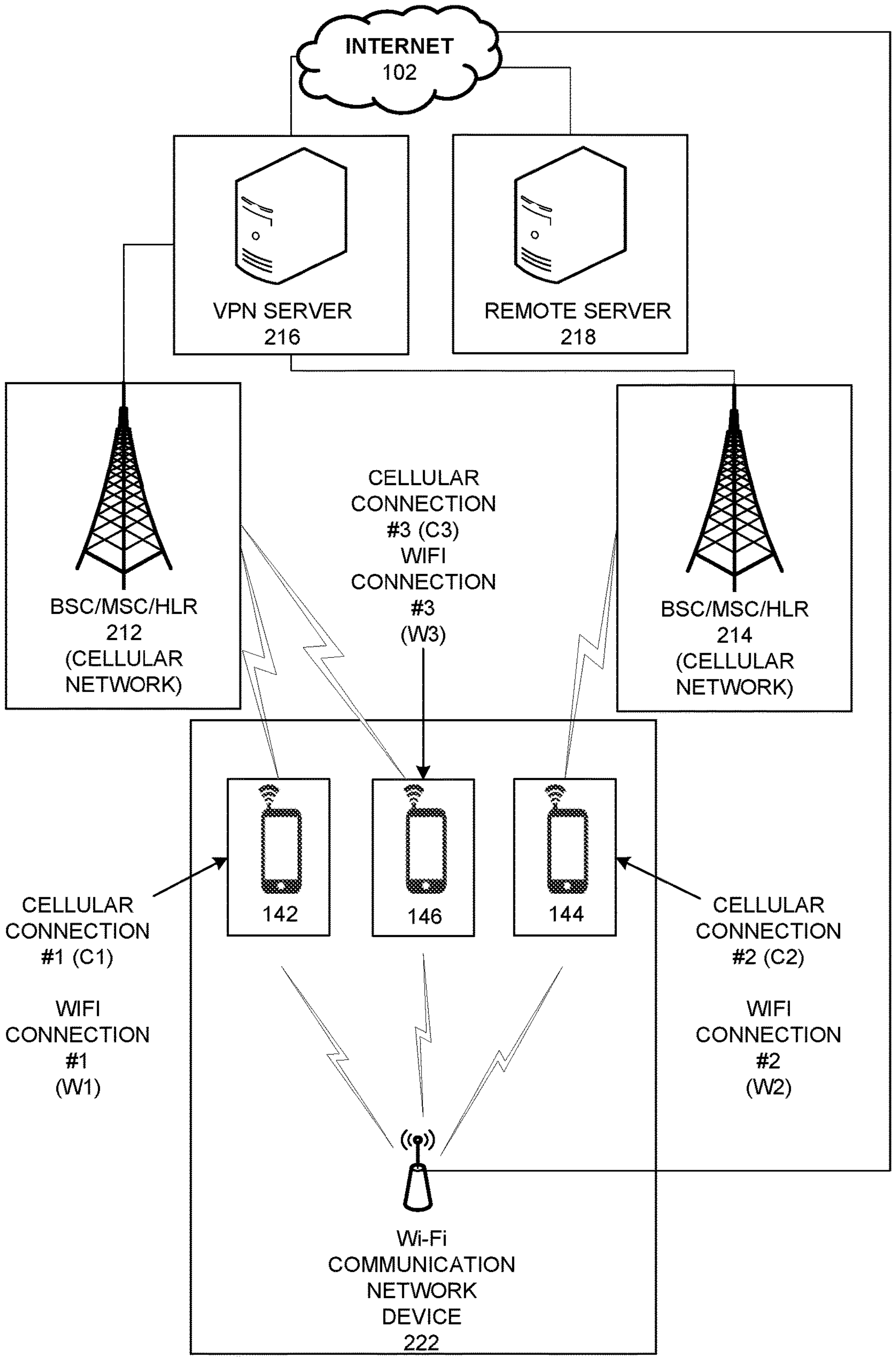
FIG. 6 illustrates a network configuration example of three devices sharing data over a Wi-Fi network according to example embodiments.

FIG. 6 illustrates a network configuration example of three devices sharing data over a Wi-Fi network according to example embodiments. Referring to FIG. 6, the network configuration 600 is similar to configuration 500, however, in this example there are three devices 142, 144 and 146 operating as client devices on a common network 222 and which are using one or more cellular connections based on their carrier services. The respective cellular connections (C1, C2, C3, etc.) and the respective Wi-Fi connections (W1, W2, W3, etc.) may be paired together in any combination of sharing among the three devices. In one example, a maximum sharing scenario with three devices would yield up to six potential Internet access options being used or intended to be used by a single device. In general, each cellular connection C1, C2, C3, etc., would be a separate Internet connection all of which could be combined as a single Internet data source by the VPN server intended for the device receiving the shared data. The Wi-Fi network may also provide an additional Internet connection, however, the different devices could share their Wi-Fi data access as well with one particular device assuming the Wi-Fi utilized bandwidth limitations on each device then the bandwidth available to each device could be shared with the data receiving device. The first device 142 could essentially use the Wi-Fi and the cellular together through a bonded connection provided by the VPN server 216 and then submit a request(s) to the other device 144 and 146 to have those devices begin requesting data access on behalf of the client device 142 via communication with the VPN server 216. Two client devices 144 and 146 could provide data retrieval from a remote server 218 or other various locations over the Internet and forward the data retrieved across the Wi-Fi network to the requesting client device 142. The VPN server 216 may manage all the connections established from the cellular networks and/or the Wi-Fi network 222 to combine the data connections as a single bonded connection that benefits the first client device 142 as a device receiving all or most of its data as shared data. The various Wi-Fi sessions may be part of a common Internet connection established by the Wi-Fi network. Generally, the devices will share their cellular Internet connections and use the Wi-Fi network as a medium to transfer the data to the client device receiving the shared data.

The sharing may be used to enable one device to benefit from one or more other devices as managed by the VPN server 216. In one example, the download data of all the devices may be on behalf of the first device 142. In this same example, the uploads of all the devices may be on behalf of the first device 142. When data limitations are identified, such as limits which prevent a client device from sharing all of its data transmission capabilities all the time, then the limits, such as download only, upload only, limited time interval, etc., may be imposed. In one example, the second device 144 may be able to only offer an upload sharing to the first device 142, such that the first device 142 may only download data on its own while the second device 144 is available for sharing only to share the uploading of data sent to it across the Wi-Fi network 222 from first device 142, while the second device 144 maintains a downloading stream of data for itself during the uploading share operation.

In the two client device example, both the first and second devices have an IP/port assignment on the common network (e.g., Wi-Fi network), which can be used to discover each other and to send general messages back and forth across the common network. To establish a data sharing session where the first device will receive the benefit of the data shared from the second device, the first device sends a request to establish a sharing session to the second device via a general messaging request. In that request, the first device's IP/port information used on the VPN server may be included to inform the second device of a network destination that the first device is attempting to send and receive data. If the second device accepts the request to share data, the second device sends a response to the first device by the general messaging application with its own IP/port on the common network, which will be designated for the communication with the VPN server. The first device then sends data destined for the VPN server, such as a request to retrieve data from a remote server, from its IP/port assignment with the VPN server to the second device's IP/port on the common network, and the second device forwards that information received from the first device to the VPN server over its cellular network to the first device's IP/port assignment on the VPN server. The second device may have an IP/port assignment on the cellular connection that the VPN server can identify and use as a destination to send the return data traffic destined for the first device. The second device would only have its own IP/port assignment on the VPN server if it was a VPN client and had its own VPN session established, which is optional, and in this example does not exist since the second device is not a VPN client device. The first device can optionally send data over its own cellular connection (if it has one) to its IP/port on the VPN server as an additional data path, this enables the VPN server to perform channel bonding of more than one communication channel (e.g., the channel between the VPN server and the second device and the channel between the VPN server and the first device). In that case, the first device would also have an IP/port on the cellular network, which the VPN server would use to send return data over that path. Finally, the data received by the first device from the second device would be ultimately returned over the common network (e.g., Wi-Fi network). The sharing (second) device would have two ports on the common network and a same IP address, one port for general messaging between the devices on the common network, and another port for data going specifically to the VPN server. The first device would also have two ports as well on the common network, one for general messaging with the second device, and another for sending and receiving data traffic with the VPN server through the second device.

FIG. 7 illustrates an example process of sharing data connections over a network according to example embodiments. Referring to FIG. 7, the process includes transmitting a request from a first device to a second device operating on a common network 712 (e.g., a Wi-Fi network), to establish a communication channel with a particular IP address and port of the VPN server 714 over a connection between the second device and the VPN server. The second device responds to the first device with an IP address and port associated with the second device on the common network, and the first device uses the IP address and port information to send data destined for the VPN server. When a response is received from the second device, the first device initiates a connection with the VPN server through the second device. The first device receives from the VPN server, via the second device, a portion of the data retrieved from the remote server over the connection 716 between the second device and the VPN server. The second device transmits the portion of the data over the common network to the first device, and the first device combines the portion of the data with another portion of the data received 718 from the VPN server via a connection by the first device with the VPN server and/or via a connection with the VPN server provided by another device (i.e., a third device). The connections to the VPN server may all be cellular connections and the communication between the first device and the second device may be performed over the Wi-Fi network.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 8:
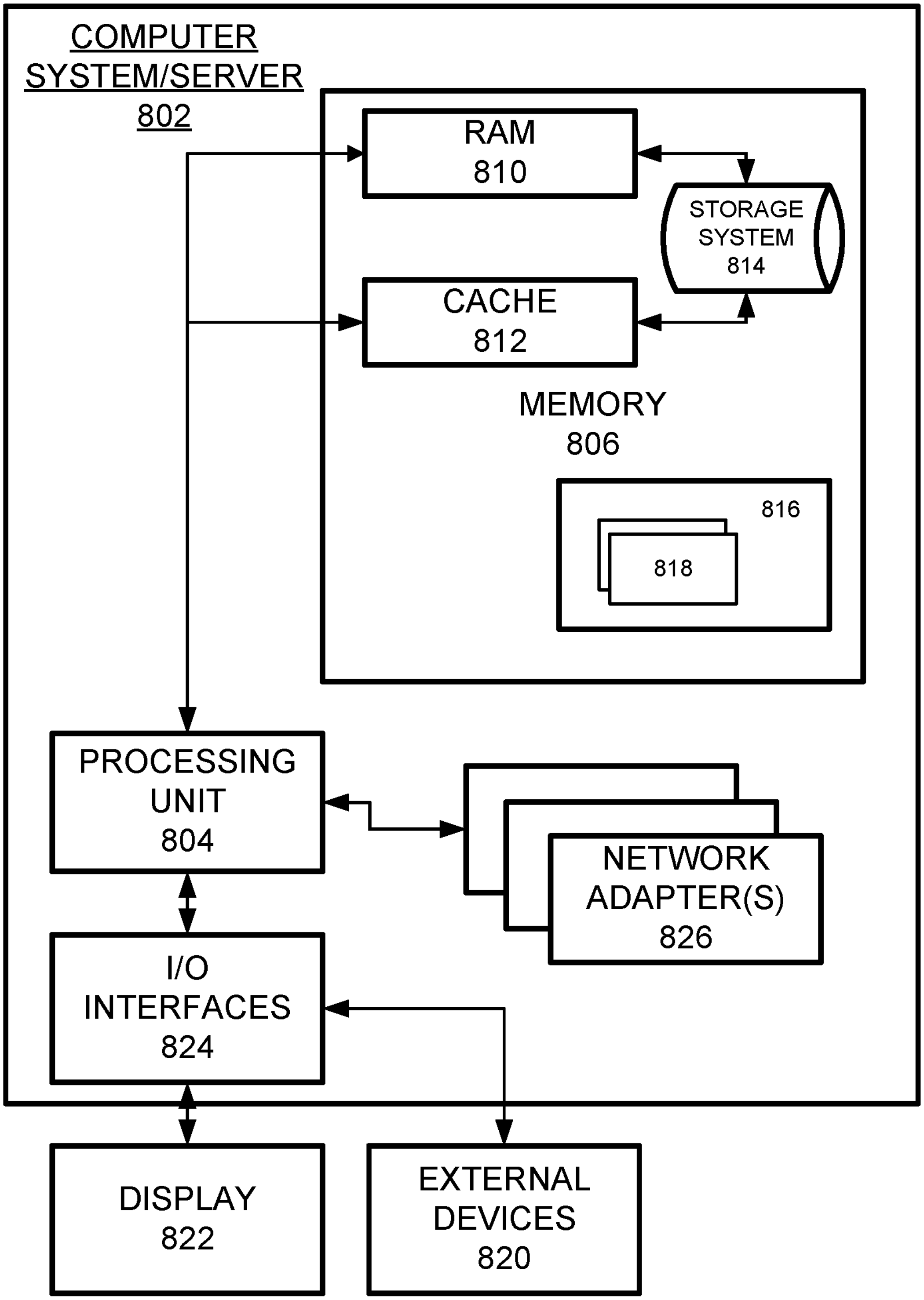
FIG. 8 illustrates a system configuration for storing and executing instructions for any of the example processes according to example embodiments.

FIG. 8 illustrates an example network entity device configured to store instructions, software, and corresponding hardware for executing the same according to example embodiments. FIG. 8 is not intended to suggest any limitation as to the scope of use or functionality of embodiments of the application described herein. Regardless, the computing node 800 is capable of being implemented and/or performing any of the functionality set forth hereinabove.

In computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, rich clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As displayed in FIG. 8, computer system/server 802 in cloud computing node 800 is displayed in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not displayed and typically called a "hard drive"). Although not displayed, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter(s) 826. As depicted, network adapter(s) 826 communicates with the other components of computer system/server 802 via a bus. It should be understood that although not displayed, other hardware and/or software components could be used in conjunction with computer system/server 802. Examples include, but are not limited to: microcode, device drivers, redundant processing units, external disk drive arrays, RAID systems, tape drives, and data archival storage systems, etc.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:

receiving a request from a first device assigned as a data receiving device at a second device assigned as a data sharing device to retrieve data from a remote server, wherein the first device and the second device are operating as mobile devices on a common network;

responsive to receiving the request, transmitting a notification to the VPN server by the second device informing the VPN server which devices on the common network have data sharing device statuses and are attempting to download data for the receiving device;

receiving from the VPN server, by the second device, a portion of the data retrieved from the remote server over the connection between the second device and the VPN server, wherein the VPN server determined the second device provide the portion of the data to the first device and the first device download another portion of the data; and transmitting, by the second device, the portion of the data over the common network to the first device, wherein the another portion of the data is received directly at the first device from a data connection outside the common network, and wherein the first device combines the portion of the data with the another portion of the data received from the VPN server.

2. The method of claim 1, wherein the second device receives the portion of the data over a cellular connection associated with the second device.

3. The method of claim 2, wherein the request is sent from the first device to the second device over a Wi-Fi connection associated with the first device and the second device both operating on the common network.

4. The method of claim 1, wherein the first device receives the another portion of the data over a cellular connection associated with the first device.

5. The method of claim 4, comprising bonding, by the VPN server, the cellular connection of the first device with the connection of the second device, which is also cellular connection; and retrieving the data from the remote server over the bonded connection, wherein the retrieved data comprises the portion of the data and the another portion of the data.

6. The method of claim 4, comprising bonding, by the VPN server, the cellular connection of the first device with the connection of the second device, which is a Wi-Fi connection; and retrieving the data from the remote server over the bonded connection, wherein the retrieved data comprises the portion of the data and the another portion of the data.

7. The method of claim 1, comprising uploading, by the second device, upload data originating from the second device to the VPN server while the second device receives the portion of the data destined for the first device from the VPN server.

8. A device comprising:

a receiver configured to receive a request from another device is assigned as a data receiving device to retrieve data from a remote server, wherein the another device and the device are operating as mobile devices on a common network and wherein the device is assigned as a data sharing device;

responsive to receiving the request, a transmitter is configured to transmit a notification to the VPN server informing the VPN server which devices on the common network have data sharing device statuses and are attempting to download data for the receiving device;

wherein the receiver is configured to receive from the VPN server a portion of the data retrieved from the remote server over the connection between the device and the VPN server, wherein VPN server determined the second device provide the portion of the data to the first device and the first device download another portion of the data; and wherein the transmitter is configured to transmit the portion of the data over the common network to the another device, wherein the another portion of the data is received directly at the first device from a data connection outside the common network, and wherein the another device combines the portion of the data with the another portion of the data received from the VPN server.

9. The device of claim 8, wherein the device receives the portion of the data over a cellular connection associated with the device.

10. The device of claim 9, wherein the request is sent from the another device to the device over a Wi-Fi connection associated with the another device and the device both operating on the common network.

11. The device of claim 8, wherein the another device receives the another portion of the data over a cellular connection associated with the another device.

12. The device of claim 11, wherein the VPN server bonds the cellular connection of the another device with the connection of the device, which is also cellular connection, and retrieves the data from the remote server over the bonded connection, and wherein the retrieved data comprises the portion of the data and the another portion of the data.

13. The device of claim 11, wherein the VPN server bonds the cellular connection of the another device with the connection of the device, which is a Wi-Fi connection, and retrieves the data from the remote server over the bonded connection, wherein the retrieved data comprises the portion of the data and the another portion of the data.

14. The device of claim 8, wherein the device uploads upload data originating from the device to the VPN server while the device receives the portion of the data destined for the another device from the VPN server.

15. A non-transitory computer readable storage medium configured to store instructions that when executed causes a process to perform:

receiving a request from a first device assigned as a data receiving device at a second device assigned as a data sharing device to retrieve data from a remote server, wherein the first device and the second device are operating as mobile devices on a common network;

responsive to receiving the request, transmitting a notification to the VPN server by the second device informing the VPN server which devices on the common network have data sharing device statuses and are attempting to download data for the receiving device;

receiving from the VPN server, by the second device, a portion of the data retrieved from the remote server over the connection between the second device and the VPN server, wherein the VPN server determined the second device provide the portion of the data to the first device and the first device download another portion of the data; and transmitting, by the second device, the portion of the data over the common network to the first device, wherein the another portion of the data is received directly at the first device from a data connection outside the common network, and wherein the first device combines the portion of the data with the another portion of the data received from the VPN server.

16. The non-transitory computer readable storage medium of claim 15, wherein the second device receives the portion of the data over a cellular connection associated with the second device.

17. The non-transitory computer readable storage medium of claim 16, wherein the request is sent from the first device to the second device over a Wi-Fi connection associated with the first device and the second device both operating on the common network.

18. The non-transitory computer readable storage medium of claim 15, wherein the first device receives the another portion of the data over a cellular connection associated with the first device.

19. The non-transitory computer readable storage medium of claim 18, wherein the processor is further configured to perform:

bonding, by the VPN server, the cellular connection of the first device with the connection of the second device, which is also cellular connection; and retrieving the data from the remote server over the bonded connection, wherein the retrieved data comprises the portion of the data and the another portion of the data.

20. The non-transitory computer readable storage medium of claim 18, wherein the processor is further configured to perform:

bonding, by the VPN server, the cellular connection of the first device with the connection of the second device, which is a Wi-Fi connection; and retrieving the data from the remote server over the bonded connection, wherein the retrieved data comprises the portion of the data and the another portion of the data.

* * * * *